(12) United States Patent
Matsumoto

(10) Patent No.: US 6,445,450 B1
(45) Date of Patent: *Sep. 3, 2002

(54) CODE READING DEVICE AND METHOD WITH LIGHT PASSING THROUGH THE CODE TWICE, AN EXPOSURE APPARATUS AND A DEVICE MANUFACTURING METHOD USING THE CODE READING

(75) Inventor: Ken Matsumoto, Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/411,634

(22) Filed: Oct. 1, 1999

(30) Foreign Application Priority Data

Oct. 9, 1998 (JP) .......................................... 10-301742

(51) Int. Cl.⁷ .............................. G01B 11/00; G06K 7/14
(52) U.S. Cl. .................... 356/401; 235/462.05; 235/454
(58) Field of Search .......................... 356/401, 36, 244, 356/237 G; 235/462.05, 454

(56) References Cited

U.S. PATENT DOCUMENTS

| | | | | |
|---|---|---|---|---|
| 4,105,926 A | * | 8/1978 | Reno et al. .................. | 250/566 |
| 4,782,219 A | * | 11/1988 | Crater ......................... | 235/462 |
| 4,856,857 A | * | 8/1989 | Takeuchi et al. ............. | 350/3.6 |
| 5,053,612 A | * | 10/1991 | Pielemeier et al. .......... | 235/462 |
| 5,636,004 A | * | 6/1997 | Ootaka et al. ................ | 355/67 |
| 5,929,997 A | * | 7/1999 | Lin .............................. | 356/401 |
| 6,024,455 A | * | 2/2000 | O'Neill et al. ............... | 359/530 |

FOREIGN PATENT DOCUMENTS

JP       7-66118       3/1995

* cited by examiner

Primary Examiner—Frank G. Font
Assistant Examiner—Phil Natividad
(74) Attorney, Agent, or Firm—Fitzpatrick, Cella, Harper & Scinto

(57) ABSTRACT

A code reading device includes an illuminator which illuminates a code formed on a substrate with light, a reflector which reflects the light to allow the light to pass through the code at least two times, and a detector which detects the reflected light to read the code on the substrate. The substrate is one of a photomask, a reticle, a wafer and a glass plate.

21 Claims, 4 Drawing Sheets

CODE READING DEVICE AND METHOD WITH LIGHT PASSING THROUGH THE CODE TWICE, AN EXPOSURE APPARATUS AND A DEVICE MANUFACTURING METHOD USING THE CODE READING

BACKGROUND OF THE INVENTION

1. Field of the Invention

The present invention generally relates to a code reading device and method suitable to an exposure apparatus and a device manufacturing method, wherein the exposure apparatus is preferably used in a lithography process for manufacturing micro-devices.

2. Description of the Related Art

A semiconductor manufacturing apparatus normally has an automated transferring system for transferring (i) a substrate (e.g., a reticle, a mask or a wafer) or (ii) a carrier cassette, which stores the substrate, between apparatuses or within the apparatus. The automated apparatus prevents contaminated particles from adhering to the substrate, and provides the ability to increase productivity.

In that transferring system, for the purpose of reliable administration of the substrates, providing the ability to discriminate and provide the correct substrate in each process, a discrimination code pattern (e.g., a barcode), having information for discriminating one substrate from other substrates, is printed on the substrate. At least one of a correction, a registration, an inquiry or a confirmation of substrate data is performed by reading the code on the substrate in each process.

Since the substrate (e.g., a reticle) is normally made of transparent glass and the code is covered with an anti-reflection film to avoid unwanted effects during exposure, a contrast between the non-transparent pattern portion of the code and the transparent portion of the glass may become lower, and that would disturb code reading. In order to address the above challenge, Japanese Laid-Open Patent Application No. 7-66118 discloses a transparent-type code reading device that has an illuminator and a detector, being separate from each other, to read the code by illuminating the code and detecting light passed through the code onto the substrate.

In recent years, new advancements in technology, such as a modified illumination arrangement and a phase-shift mask, to increase resolution, have been developing to allow ultra-precise resolution of line widths thinner than an exposure light wavelength. Simultaneously, a so-called halftone mask, which has circuit patterns having half transparency, has appeared.

However, in the above-mentioned halftone mask, if the discrimination code pattern is formed beside the circuit patterns in the same manner as the circuit patterns, the code pattern has a high transparency, and a contrast between pattern-formed portions and non-pattern-formed portions becomes lower as the pattern transparency increases. As a result, it would become unsuitable for reading, and may cause a reading error.

SUMMARY OF THE INVENTION

The present invention is provided to overcome the challenges discussed above and a general object of the invention is to provide an improved code reading device, and an exposure apparatus and a semiconductor manufacturing method utilizing the improved code reading device.

It is a still more specific object of the invention to provide a reliable device being capable of reading a code formed on a substrate, with stability, even though the code pattern has a high transparency or even though the contrast is not so high.

According to one aspect of the present invention, a code reading device comprises an illuminator which illuminates a code on a substrate with light, a reflector which reflects the light to allow the light to pass through the code on the substrate at least two times, and a detector which detects the reflected light to read the code on the substrate.

According to another aspect of the present invention, an exposure apparatus comprises a storage unit which stores a plurality of substrates, wherein the substrate is one of a photomask, a reticle, a wafer and a glass plate, an exposure unit which performs exposure operations with the substrate, a code reading device and a handler. The code reading device has an illuminator which illuminates with light a code formed on one of the plurality of substrates, a reflector which reflects the light to allow the light to pass through the code on the substrate at least two times, and a detector which detects the reflected light to read the code on the substrate. The handler handles a respective one of the substrates to move the substrate to a reading position for reading of the code by the detector.

According to yet another aspect of the present invention, a semiconductor manufacturing method comprises the steps of performing exposure operations with a substrate, wherein the substrate is one of a photomask, a reticle, a wafer and a glass plate, and the substrate has an exposure pattern and a code formed thereon, illuminating the code formed on the substrate with light to read the code and administer a respective substrate, allowing the light to pass through the code on the substrate at least two times so as to increase a reading contrast of the code, and reading the illuminated code on the substrate.

These and other objects, features and advantages of the present invention will become more apparent from the following description of the preferred embodiments taken in conjunction with the accompanying drawings.

DESCRIPTION OF THE PREFERRED EMBODIMENTS

The invention will be described in further detail by way of example with reference to the accompanying drawings.

Figure 1:
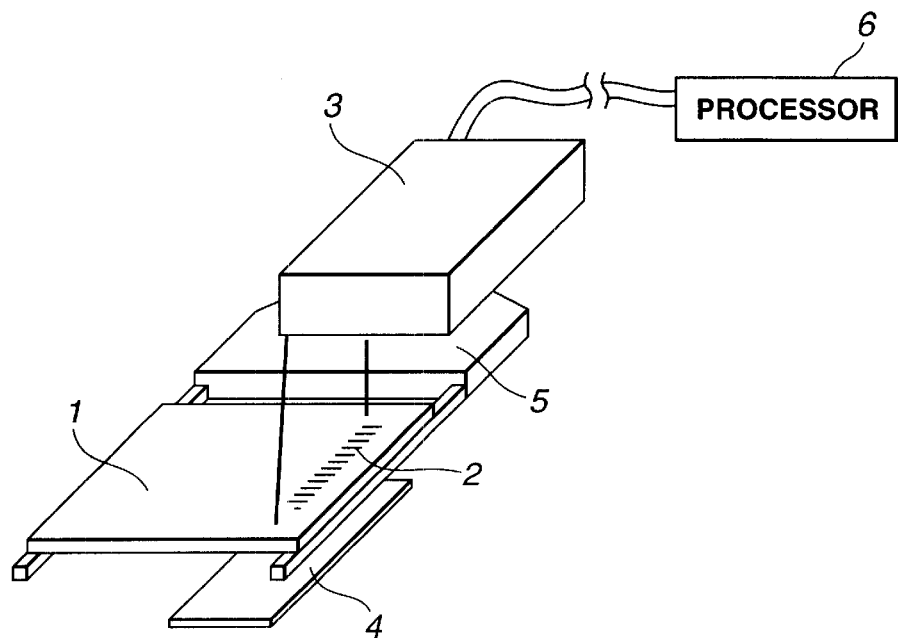
FIG. 1 shows a structure of a code reading device for a semiconductor manufacturing apparatus, such as a stepper or the like, according to an embodiment of the present invention.

FIG. 1 illustrates a structure of a code reading device for a semiconductor manufacturing apparatus, such as a stepper or the like, according to an embodiment of the present invention. Referring to FIG. 1, a transparent substrate 1 (e.g., a reticle, a mask or a glass wafer) has an exposure pattern (e.g., circuit patterns) and a barcode (discrimination code) 2 formed on one side of the substrate near the edge. The barcode 2 includes information for distinguishing reticle 1 from other substrates.

The code reading device includes a barcode reader 3 having an illuminator (including a light source and an optical system) and a detector (including an array sensor), as a unit, a mirror 4 as a reflector disposed opposite to the barcode reader 3 with respect to the substrate 1, a carrying hand 5 for carrying the substrate 1 to a reading position (as shown in FIG. 1) between the bar code reader 3 and the mirror 4, and a processor 6 for processing signals from the detector to discriminate the code. In the semiconductor manufacturing apparatus, the carrying hand 5 draws a substrate out of a storage cassette and carries it to the reading position.

Figure 2:
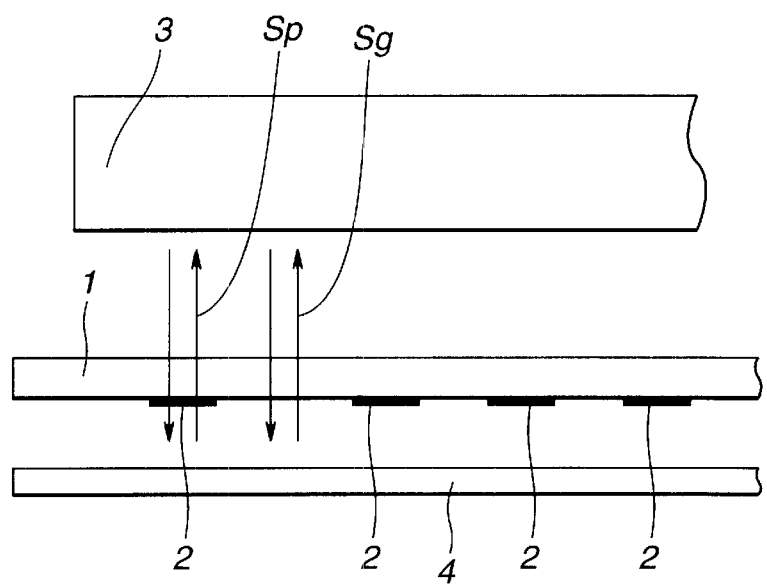
FIG. 2 is a drawing for explaining the principle of code reading.

FIG. 2 is a drawing for explaining the principle of code reading. An illumination light beam, emitted from the illuminator built into the barcode reader 3, is directed at an angle perpendicular to the substrate 1 and passes through the substrate 1 having barcode 2. In this embodiment, the pattern of the barcode 2 is formed on the underside (i.e., mirror 4 side) of the substrate 1. Then, the light beam is reflected at the surface of mirror 4, which is perpendicular to the incident light beam, so that the reflected beam passes through the substrate 1 again. The light beam from the illuminator is first attenuated by the pattern portion, and the reflected light beam is then attenuated by the same pattern portion. Finally, the reflected beam is detected by the detector built into the barcode reader 3. The location of the barcode 2 is, however, not limited to that disclosed.

A contrast between the pattern portion of the barcode and the transparent portion of the substrate (glass) is formulated as given below, wherein, S: the strength of the illumination light beam, Rp: a reflectivity of the barcode pattern to the illumination light, Tp: a transmittancy of the barcode pattern to the illumination light, Tg: a transmittancy of the substrate (glass), Sp: a light strength of a pattern portion detected by the detector, and Sg: a light strength of a transparent portion of the substrate detected by the detector:

$$Sp:Sg = (Tp^2 + Rp) \cdot S : Tg^2 \cdot S \tag{1}$$

Comparing the transmittancy Tg with the transmittancy Tp:

$$Tp << Tg = 0.9 \sim 1.0 \tag{2}$$

If the detector is positioned at the location of mirror 4, a contrast between the pattern portion and the transparent portion of the substrate (glass) is formulated as given below, wherein, Spt: a light strength of a pattern portion detected by the detector, and Sgt: a light strength of a transparent portion of the substrate detected by the detector:

$$Spt:Sgt = Tp \cdot S : Tg \cdot S \tag{3}$$

An LED (light-emitting diode) or a semiconductor laser (a laser diode) having a wavelength around 660 nm would be preferably used as the illuminator for the barcode reader 3. For example, in a phase-shift mask used for KrF (248 nm) excimer laser exposure apparatuses, Rp as a reflectivity of the patterns is about 10%, and Tp as a transmittancy of the patterns is about 50% relative to the barcode reader illumination light (660 nm). Applying these values to equations (1) and (3):

$$Sp:Sg = (0.5^2 + 0.1)S : 0.9^2 S = 0.35S : 0.81S \tag{1'}$$

$$Spt:Sgt = 0.5S : 0.9S \tag{3'}$$

Comparing equation (1') with equation (3'), about a 30% increase in the signal-to-noise (S/N) ratio is provided in the present embodiment. Thus, enough contrast is obtained to read with high stability, regardless of mask characteristics.

Each line width of the barcode pattern is defined to be at least about 128 $\mu$m by the international barcode standard. A barcode pattern width is sufficiently larger than the illumination wavelength (660 nm) to avoid the influence of diffraction beams.

To obtain sharp detection signals, it is preferable to set the mirror 4 close to the substrate 1. The mirror 4 can be a smooth flat mirror (if the illumination light beam is a parallel beam), a smooth curved mirror (if the illumination light beam is a diverging beam) or a diffused reflector, such as white paper. Also, a corner-cube mirror (or a cats-eye mirror) can be used as the mirror 4 instead of a smooth mirror. The corner-cube mirror needs to have many minute cube corners on the reflecting surface thereof, which is arranged at least along a direction in which the barcode patterns are arranged. Each cube corner has a size sufficiently smaller than the barcode pattern pitch in the arrangement direction, and has a function to reflect an incident beam to an angle the same as that of the incident beam. That is, even if an angle of the incident beam is not perpendicular to the mirror surface, a reflected beam traces almost the same path (i.e., exactly the same angle) of the incident beam, so that sharp detection signals are obtained.

Figure 3:
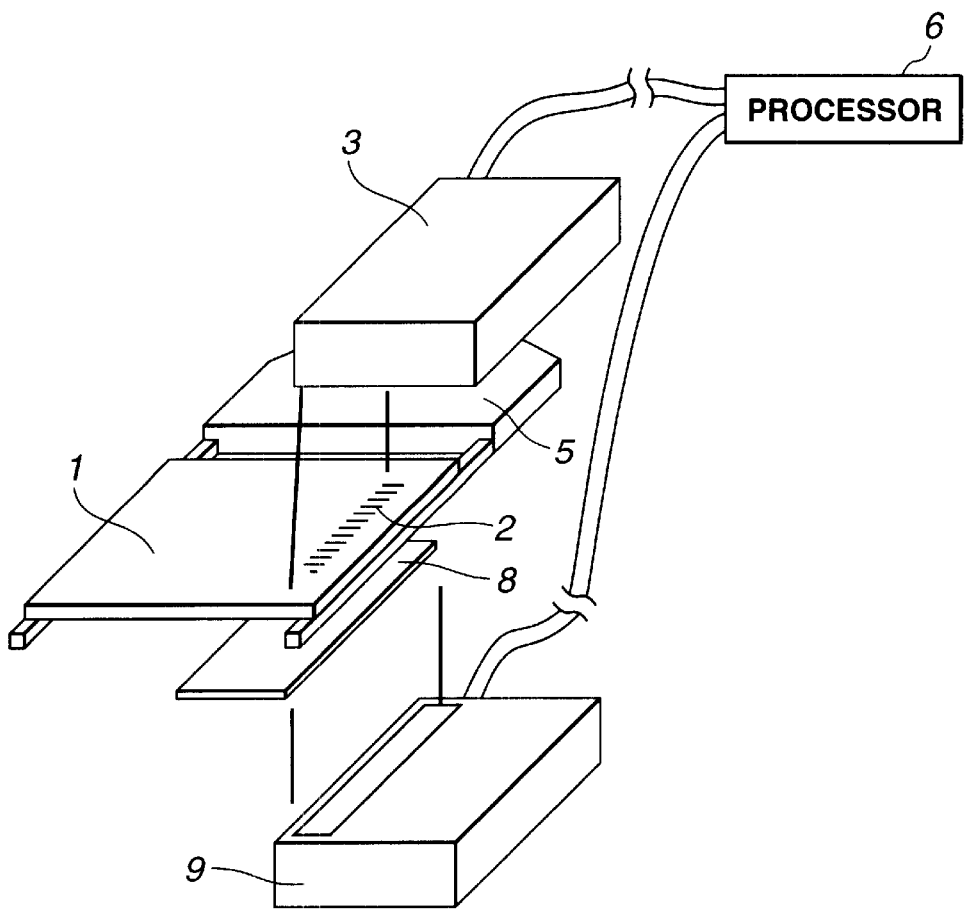
FIG. 3 shows a modified embodiment of the code reading device of the invention.

FIG. 3 illustrates a modified embodiment of the present invention, in which parts similar to those previously described with reference to FIG. 1 are denoted by the same reference numerals. In this embodiment, instead of using the mirror 4 shown in FIG. 1, a mirror 8, which is a half-mirror with a half reflectivity and a half transmittancy, is utilized. Also, a second barcode reader 9 (including a detector, but not including an illuminator) is additionally disposed at a position under the mirror 8, to detect a transmittancy light beam passed through the barcode pattern. The barcode reader 3 reads a substrate having a halftone barcode pattern, while the second barcode reader 9 is suitable for a substrate having a high reflectivity pattern and a low transmittancy pattern (lower than 50%). A processor 6 includes a signal controller to choose at least one of the detection signals from the two barcode readers 3, 9, and by using one or both of the two barcode readers, the reading device according to this embodiment can adapt to any substrate having a barcode pattern of any reflectivity Rp and transmittancy Tp.

The embodiments described above are not limited to using a barcode and a barcode reader. For example, by using an OCR (Optical Character Reader) or a pattern analyzer instead of the barcode reader, any patterns or characters printed or inscribed on the substrate can be read. In the meantime, it is not necessary to provide the illuminator and the detector as a unit in the barcode reader 3. Namely, these are able to be separated from each other according to an optical arrangement design. Also, although the above embodiments show that an illumination light beam passes through a code on the substrate two times (round-trip), an arrangement could be provided such that optical elements let the light beam pass two or more times so as to increase reading contrast even more.

Figure 4:
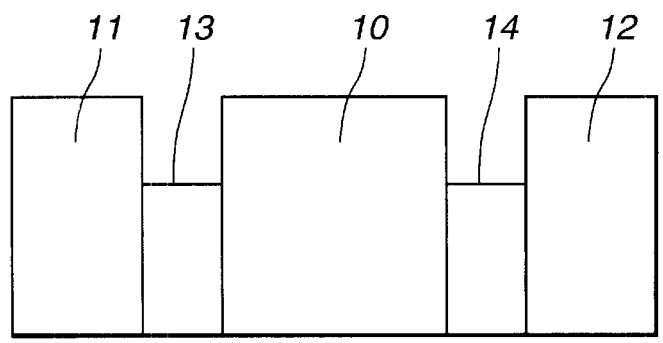
FIG. 4 schematically shows a structure of an exposure apparatus including the code reading device of the invention.

FIG. 4 schematically illustrates an exposure apparatus utilizing the code reading devices of the present invention.

The apparatus comprises an exposure unit 10 for performing an exposure operation to print micro-device circuit patterns using a mask (or a reticle) and a wafer (e.g., a glass substrate). The exposure unit has a light source, e.g., a KrF (248 nm) or an ArF (193 nm) excimer laser, and optical systems for illuminating and projecting, and stages for holding and moving the mask and the wafer. A mask changer 11 stores a plurality of masks for each of the plurality of processes, and a wafer changer 12 stores a plurality of wafers. A transporter 13, including a code reading device as described above, discriminates a mask by reading a code on the mask and transports it to and from the exposure unit 10. Also, a transporter 14, including a code reading device as described above, discriminates a wafer by reading a code on the wafer and transports it to and from the exposure unit 10.

Figure 5:
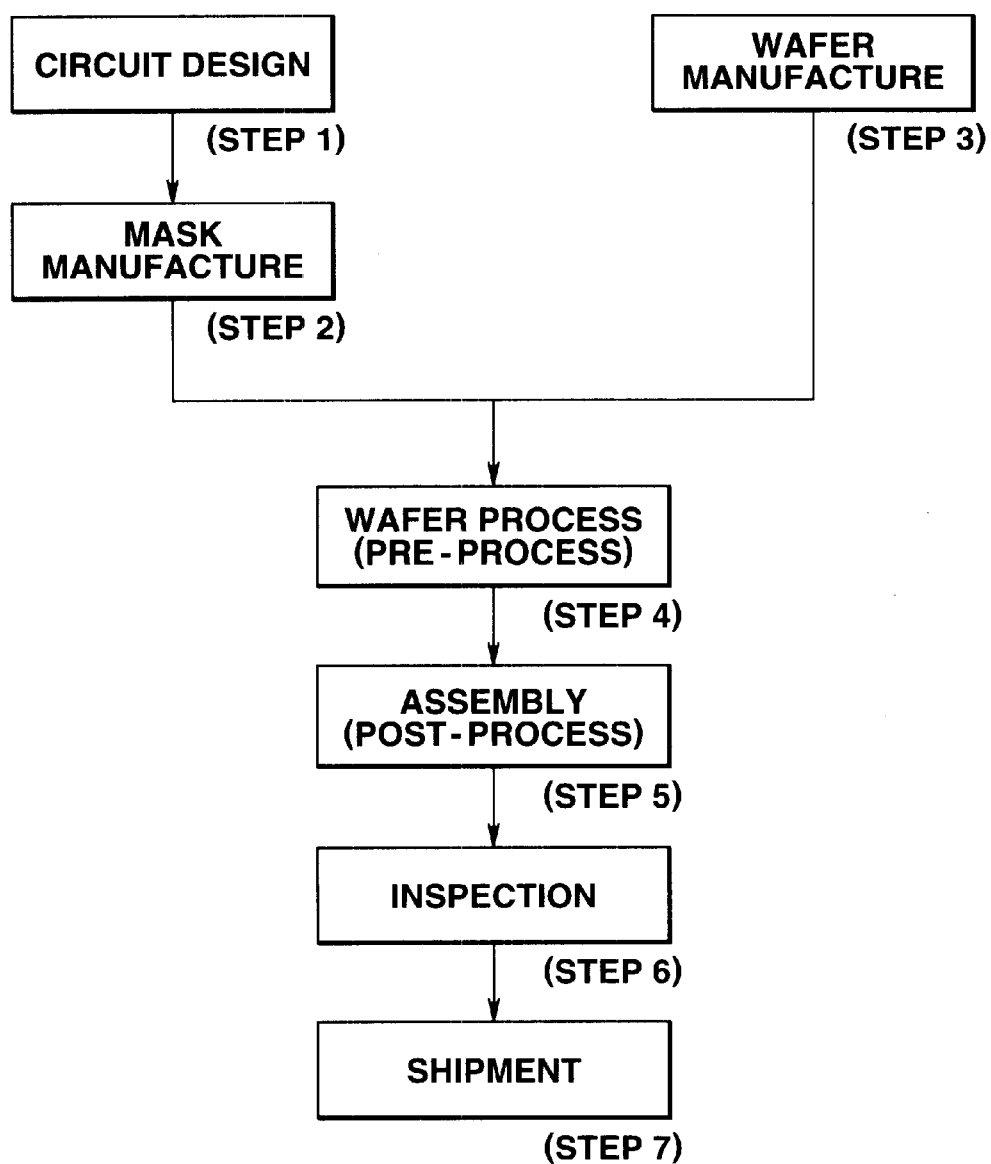
FIG. 5 is a flowchart showing a process for manufacturing a micro-device.

FIG. 5 is a flow chart showing a process for manufacturing a micro-device (e.g., a semiconductor chip such as an IC or an LSI, a liquid crystal panel, a CCD (charge-coupled device), a thin film magnetic head, a micro-machine or the like). At step 1 (circuit design), the circuit design of the semiconductor device is effected. At step 2 (the manufacturing of a mask), a mask, as the substrate as described in the above embodiments, formed with the designed circuit pattern, is manufactured. On the other hand, at step 3 (the manufacturing of a wafer), a wafer is manufactured by the use of a material such as silicon. Step 4 (wafer process) is called a pre-process, in which by the use of the manufactured mask and wafer, an actual circuit is formed on the wafer by lithography techniques. The next step, step 5 (assembling), is called a post-process, which is a process for making the wafer manufactured at step 4 into a semiconductor chip, and includes steps such as an assembling step (dicing and bonding) and a packaging step (enclosing the chip). At step 6 (inspection), inspections such as an operation confirming test and a durability test of the semiconductor device manufactured at step 5 are carried out. Via such steps, the semiconductor device is completed, and it is delivered (step 7).

Figure 6:
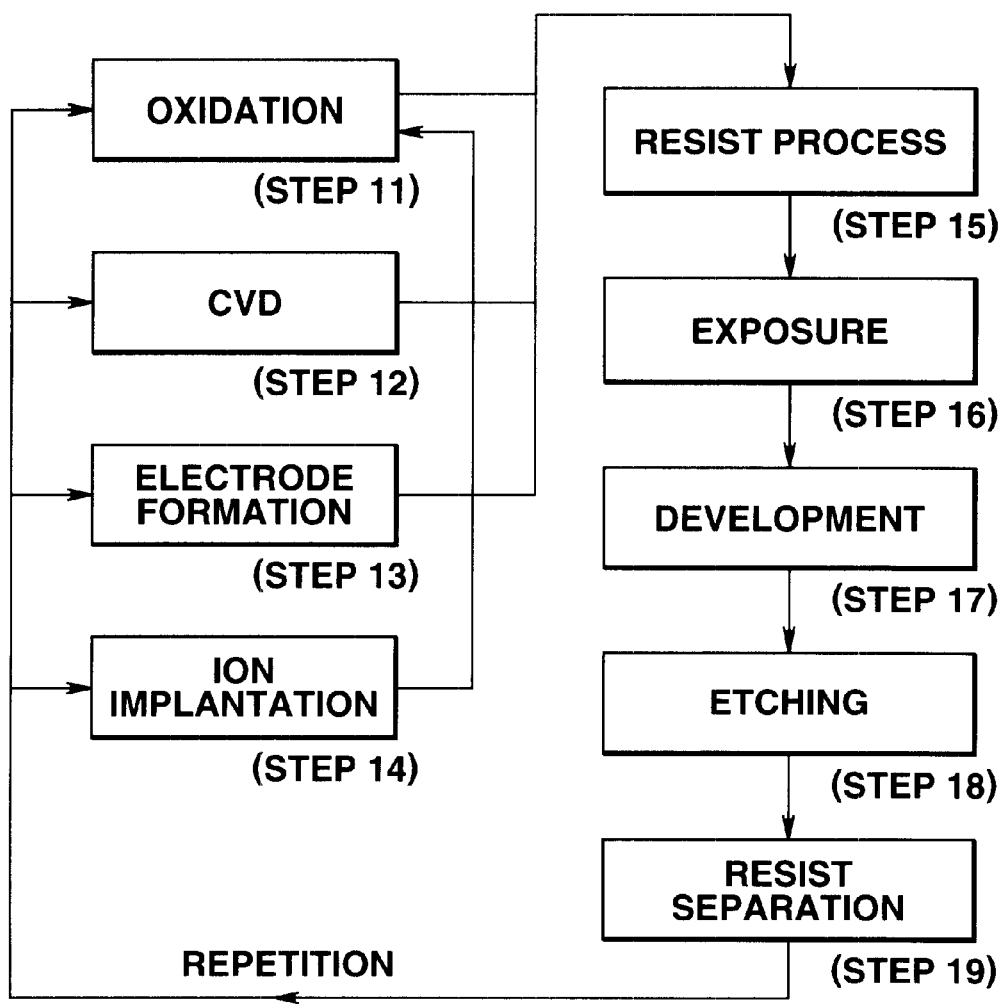
FIG. 6 is a flowchart showing the detailed steps of the wafer process in the micro-device manufacturing process shown in FIG. 4.

FIG. 6 is a flow chart showing the detailed steps of the wafer process discussed above with respect to step 4. At step 11 (oxidation), the surface of the wafer is oxidized. At step 12 (chemical vapor deposition—CVD), an insulating film is formed on the surface of the wafer. At step 13 (the forming of an electrode), an electrode is formed on the wafer by vapor deposition. At step 14 (ion implantation), ions are implanted into the wafer. At step 15 (resist processing), a photo-resist is applied to the wafer. At step 16 (exposure), the circuit pattern of the mask is printed and exposed onto the wafer by the exposure apparatus. At step 17 (development), the exposed wafer is developed. At step 18 (etching), the portions other than the developed resist image are scraped off. At step 19 (the peeling-off of the resist), the resist which has become unnecessary after the etching is removed. By repetitively carrying out these steps, circuit patterns are multiplexly formed on the wafer.

If the manufacturing method of the present embodiment is used, it will be possible to manufacture semiconductor devices having a high degree of integration, which have heretofore been difficult to manufacture.

Except as otherwise disclosed herein, the various components shown in outline or in block form in the figures are individually well known and their internal construction and operation are not critical either to the making or using of this invention, or to a description of the best mode of the invention.

While the present invention has been described with respect to what is at present considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A code reading device comprising:
    an illuminator which directly illuminates a code formed on a substrate with a light beam;
    a reflector which reflects the light beam to allow the light beam to pass through the code at least two times; and
    a detector which detects the reflected light obtained directly from the substrate to read the code on the substrate,
    wherein the light beam reflected by the reflector passes through a substantially same pattern portion of the code as the light beam illuminated from the illuminator.

2. A device according to claim 1, further comprising a handler which handles the substrate to move the substrate to a reading position for reading of the code by said detecter.

3. A device according to claim 1, wherein said reflector is positioned on a side of the substrate opposite to that of said illuminator and said detector during reading of the code, and the light passes through the code two times.

4. A device according to claim 3, wherein said illuminator and said detector are provided as a unit.

5. A device according to claim 1, wherein said reflector comprises a mirror.

6. A device according to claim 5, wherein said mirror reflects an incident light beam in a direction the same as that of the incident light.

7. A device according to claim 5, wherein said mirror is a smooth mirror.

8. A device according to claim 5, wherein said mirror is one of a corner-cube mirror and a cats-eye mirror.

9. A device according to claim 1, wherein said reflector comprises a half-mirror, and further comprising a second detector, which is located on a side opposite to said illuminator, with respect to said half-mirror.

10. A device according to claim 9, further comprising a processor for processing signals from at least one of said first and second detectors.

11. A device according to claim 1, wherein the code is formed on one side of the substrate, and each of said illuminator and said detector is located on an opposite side of the substrate.

12. A device according to claim 3, wherein the substrate is one of a photomask, a reticle, a wafer and a glass plate.

13. A device according to claim 12, wherein the substrate is a halftone mask having a halftone device pattern and the code comprises a halftone pattern.

14. A device according to claim 12, wherein the code comprises a barcode pattern having information for discriminating the substrate.

15. An exposure apparatus comprising:
    a storage unit which stores a plurality of substrates, wherein each substrate is one of a photomask, a reticle, a wafer and a glass plate;
    an exposure unit which performs exposure operations with the substrate;
    a code reading device that includes (i) an illuminator which directly illuminates with a light beam a code formed on one of the plurality of substrates, a reflector which reflects the light beam to allow the light beam to pass through the code at least two times, and a detector which detects the reflected light obtained directly from the substrate to read the code on the substrate, the light beam reflected by the reflector passing through a substantially same pattern portion of the code as the light beam illuminated from the illuminator; and a handler which handles a respective one of the substrates to move the substrate to a reading position for reading of the code by said detector.

16. An apparatus according to claim 15, wherein the substrate is a halftone mask having a halftone device pattern and the code comprises a halftone pattern.

17. An apparatus according to claim 15, wherein said exposure unit comprises an excimer laser source.

18. An exposure apparatus according to claim 15, wherein the reading of a code on the substrate is performed while the substrate is transferred from the storage unit to the exposure unit.

19. A code reading device comprising:

an illuminator which illuminates a code formed on a substrate with a light beam;

a reflector which reflects the light beam to allow the light beam to pass through the code at least two times;

a detector which detects the reflected light beam to read the code on the substrate; and a handler which handles the substrate with respect to the reflector, wherein the light beam reflected by the reflector passes through a substantially same pattern portion of the code as the light beam illuminated from the illuminator.

20. An exposure apparatus comprising:

a storage unit which stores a plurality of substrates, wherein each substrate is one of a photomask, a reticle, a wafer and a glass plate;

an exposure unit which performs exposure operations with the substrate;

a code reading device that includes (i) an illuminator which illuminates with a light beam a code formed on one of the plurality of substrates, a reflector which reflects the light beam to allow the light beam to pass through the code at least two times, and a detector which detects the reflected light beam obtained directly from the substrate to read the code on the substrate; and a handler which handles a respective one of the substrates with respect to the reflector, wherein the light beam reflected by the reflector passes through a substantially same pattern portion of the code as the light beam illuminated from the illuminator.

21. An exposure apparatus according to claim 20, wherein the reading of the code on the substrate is performed while the substrate is transferred from the storage unit to the exposure unit.

* * * * *

UNITED STATES PATENT AND TRADEMARK OFFICE
CERTIFICATE OF CORRECTION

PATENT NO.     : 6,445,450 B1
DATED          : September 3, 2002
INVENTOR(S)    : Ken Matsumoto It is certified that error appears in the above-identified patent and that said Letters Patent is hereby corrected as shown below:

Column 6,
Line 23, "detecter." should read -- detector. --.
Line 50, "claim 3," should read -- claim 1, --.
Line 53, "is" should read -- has -- and "mask having a halftone" should be deleted.

Column 7,
Line 12, "is" should read -- has -- and "mask having a halftone" should be deleted.

Signed and Sealed this

Eighteenth Day of February, 2003

JAMES E. ROGAN
*Director of the United States Patent and Trademark Office*